(12) United States Patent
Germano

(10) Patent No.: US 6,273,407 B1
(45) Date of Patent: Aug. 14, 2001

(54) SPRING STRUT FOR A MOTOR VEHICLE HAVING A BEARING FOR A COIL SPRING

(75) Inventor: Francesco Germano, Bietigheim-Bissingen (DE)

(73) Assignee: Dr. Ing. h.c. F. Porsche Aktiengesellschaft, Stuttgart (DE)

(*) Notice: Subject to any disclaimer, the term of this patent is extended or adjusted under 35 U.S.C. 154(b) by 0 days.

(21) Appl. No.: 09/641,967

(22) Filed: Aug. 21, 2000

(30) Foreign Application Priority Data

Aug. 20, 1999 (DE) ................................. 199 39 515

(51) Int. Cl.$^7$ ................................. F16F 1/12; B60G 15/07
(52) U.S. Cl. ................................. 267/221; 267/172
(58) Field of Search ................................. 267/33, 34, 172, 267/221; 88/322.19, 321.11

(56) References Cited

U.S. PATENT DOCUMENTS

| | | | |
|---|---|---|---|
| 4,482,135 | * 11/1984 | Ishida et al. | 267/33 |
| 5,470,049 | * 11/1995 | Wohler et al. | 267/172 |
| 5,848,676 | * 12/1998 | Deigner | 188/321.11 |

FOREIGN PATENT DOCUMENTS

| | | |
|---|---|---|
| 42 11 176 A1 | 10/1993 | (DE) . |
| 196 41 728 A1 | 4/1998 | (DE) . |
| 197 48 634 A1 | 5/1998 | (DE) . |
| 0 564 824 B1 | 5/1995 | (EP) . |

* cited by examiner

*Primary Examiner*—Christopher P. Schwartz
(74) *Attorney, Agent, or Firm*—Crowell & Moring, LLP

(57) ABSTRACT

A bearing for a spring strut as well as for a coil spring of the spring strut is provided by way of spring supports which rest against supporting elements and are held in a mutually non-rotatable manner by twist fixations. The spring elements are constructed such that the same stiffnesses are formed over the circumference of the spring winding even though the twist fixation is provided. Furthermore, a spring plate of the lower bearing of the spring is provided. The spring plate is adjustably arranged on the shock absorber tube, and thus springs which have different lengths can be used.

17 Claims, 6 Drawing Sheets

SPRING STRUT FOR A MOTOR VEHICLE HAVING A BEARING FOR A COIL SPRING

This application claims the priority of German application 199 39 515.2, filed Aug. 20, 1999, the disclosure of which is expressly incorporated by reference herein.

BACKGROUND AND SUMMARY OF THE INVENTION

The present invention relates to an improved spring strut of a motor vehicle having a bearing for a coil spring with elastic spring supports received by supporting elements, on which spring supports the coil spring is supported. A spring supporting surface on at least one of the elastic spring supports extends in a sloped manner corresponding to a pitch of the spring and has an elasticity which is the same in a supporting area of the spring.

European Patent Document EP 0 564 824 B1 relates to a bearing on a vehicle body for a spring strut of a motor vehicle. This bearing has a spring plate holding an elastic support, and a coil spring is supported on the spring plate. The elastic support has a spring supporting surface extending in a sloped manner corresponding to the pitch of the spring and an elasticity which is the same in the supporting area of the spring. For achieving the same elasticity in the upper supporting area of the spring, a spacing element which engages by way of shaped-out areas in the spring element is provided. The effective resilient area, in each case, has a uniform spacing along the circumference of the spring.

It is an object of the invention to provide a spring strut with an improved bearing for a spring by which buckling of the coil spring is avoided during cushioning operations. In addition, stress concentrations on the spring plate are to be prevented. Furthermore, it should be possible to easily use springs of different lengths.

According to certain embodiments of the invention, this object is achieved by configuring the spring strut such that free ends of the spring are supported by way of elastic spring supports held in the supporting elements. One of the elastic spring supports is held in one of the supporting elements on the vehicle body and the other of the elastic supports is held in the other of the supporting elements at a shock absorber tube. Twist fixations, by way of which the supporting elements are in mutual engagement with corresponding ones of said spring supports, are provided. The spring supports are resiliently constructed in the area of these fixations. A spring plate carries the supporting element and the spring support. The spring plate is detachably connected with a shock absorber tube of the spring strut and is supported, on the shock absorber tube, on bearings.

Additional advantageous characteristics are also reflected in the claims.

The principal advantages achieved by the invention are that, as a result of the construction and corresponding arrangement of the supporting element with the spring support, on the one hand, no buckling of the spring will occur during dynamic operations and, on the other hand, the spring support cannot rotate in the supporting element. As a result, no change in the supporting position of the spring with respect to the spring plate takes place. For this purpose, each free end of the spring is supported by way of the elastic spring support held in a supporting element, on the one hand, on the vehicle body and, on the other hand, on the shock absorber tube. The supporting elements are in a mutual engagement with the spring supports by way of twist fixations, and the spring support has a resilient construction in this fixing area.

A form-locking connection between the supporting element and the spring support takes place by way of two spaced teeth in the supporting element which engage in a corresponding recess in the spring support. A clearance exists between the two teeth, and the lateral boundary flanks of the recess adjoin outer flanks of the teeth in a form-locking manner. This prevents mutual rotatability.

So that, despite the twist fixation, the same elastic effect can take place along the entire winding, the lower free end of the spring ends directly next to the boundary surface, and the spring winding above and in the area of the recess is released from the guide groove of the spring support. For this purpose, the spring support has a supporting surface corresponding to the angle of the spring winding which is constructed parallel to a supporting surface on the supporting element to the twist fixation and is constructed along the entire circumference with approximately the same stiffness and the same thickness.

In order to prevent the elastic spring support from being crushed during dynamic load conditions, and so that the stiffness is not advantageously changed, the lower supporting element can be a pot-shaped part with a bent-up edge. As a result, the edge reaches partly around the spring support. The edge is interrupted only in the area of the teeth, so that no additional friction occurs in this area and an unhindered spring effect can occur. The upper bearing plate receives the supporting element and the spring support, also has a pot-shaped construction, and reaches around the supporting element and the spring support in a spaced manner.

The elastic spring supports are formed of rubber or a similar material, and the supporting element is formed of plastic or a light metal. The spring plate may be formed of aluminum or steel.

So that the distance between the vehicle-body-side support and the lower spring plate can be varied, the spring plate can be fitted onto the shock absorber tube and rotated such that the spring plate can be adjusted at different levels on the shock absorber strut. The spring plate has a plurality of recesses on its interior circumferential surface for this purpose, and these recesses are distributed along the circumference. At least three recesses have the same depth, and the additional recesses have a different depth.

Embodiments of the invention are illustrated in the drawings and will be described in detail.

BRIEF DESCRIPTION OF THE DRAWINGS

FIG. 16 is a view of a shock absorber tube with bearings for the adjustable spring plate according to FIGS. 14 and 14a.

DESCRIPTION OF THE PREFERRED EMBODIMENTS

Figure 1:
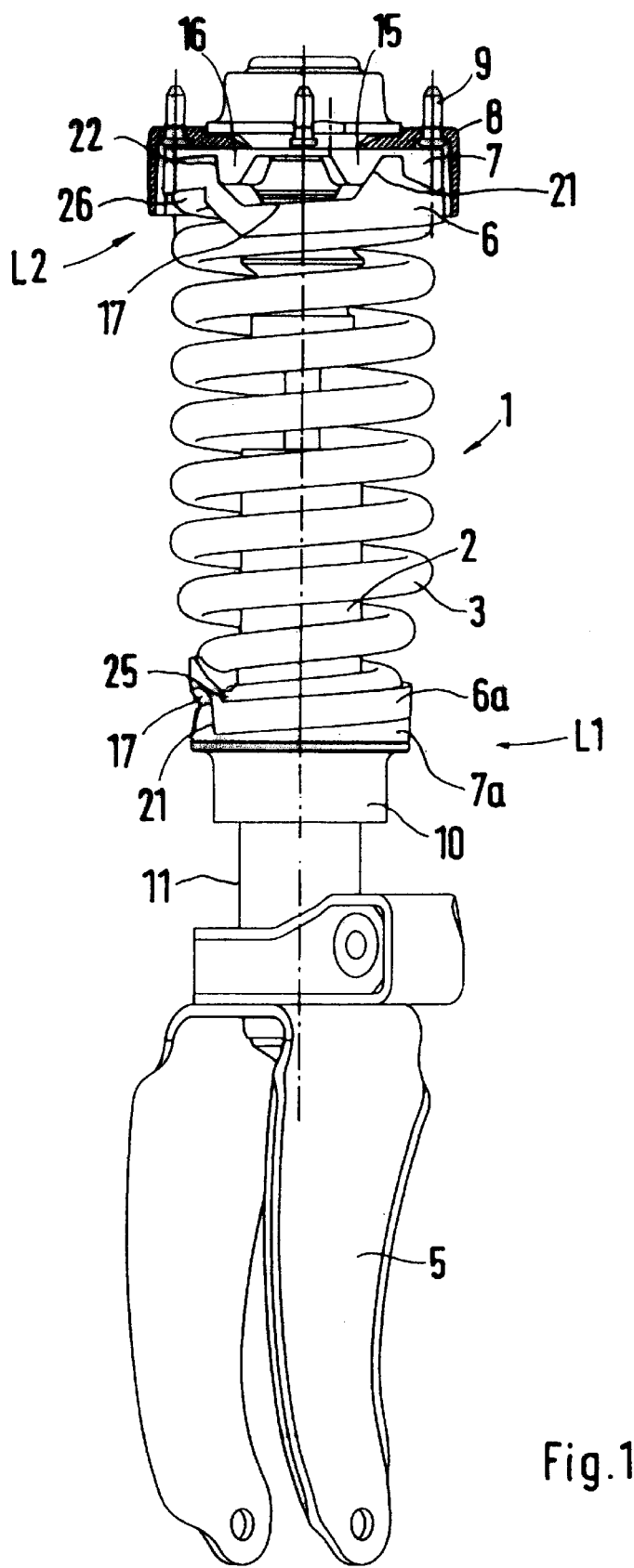
FIG. 1 is a view of a spring strut with upper and lower spring bearings.

A spring strut 1 includes a shock absorber 2 which is surrounded by a spring 3. An upper bearing L2 is connected with a vehicle body. At the lower end of the shock absorber 2, at the rear axle, for example, an elastic bearing and, at the front axle, for example, a fork 5 is provided for connection with a wheel suspension link. The spring 3 is held on the upper end of the spring strut 1 in an elastic spring support 6 which is disposed in a supporting element 7. The spring support and the supporting element form a bearing unit 6, 7 arranged in a pot-shaped bearing plate 8 which can be connected by screws 9 with the vehicle body.

The lower end of the spring 3, similar to the upper end thereof, is supported in a spring support 6a. This spring support is held in a supporting element 7a which is supported on a spring plate 10 or 10a. This spring plate 10 or 10a is connected with the shock absorber tube 11 in either a fixed or a vertically adjustable manner.

The spring supports 6 and 6a of the upper and lower bearings L1 and L2 and the supporting elements 7 and 7a have approximately the same shape but different dimensions. FIGS. 3 to 11 each show only one spring support and one supporting element, while FIGS. 1 and 2 show both elements.

The spring support 6, 6a according to FIGS. 3 to 6 has a spring supporting surface 12, which extends in a sloped manner corresponding to the pitch of the spring 3, and a guide groove 13. A supporting element 7, 7a is connected with the spring support 6, 6a by way of a twist fixation 14. This fixation 14 comprises at least two teeth 15, 16 which engage in a corresponding recess 17 of the spring support 6, 6a. The teeth 15, 16 have a clearance 18 between one another, and outer tooth flanks 19, 20 rest form-lockingly against a lateral boundary surfaces 21, 22 of the recess 17 in the spring support 6, 6a.

Figure 2:
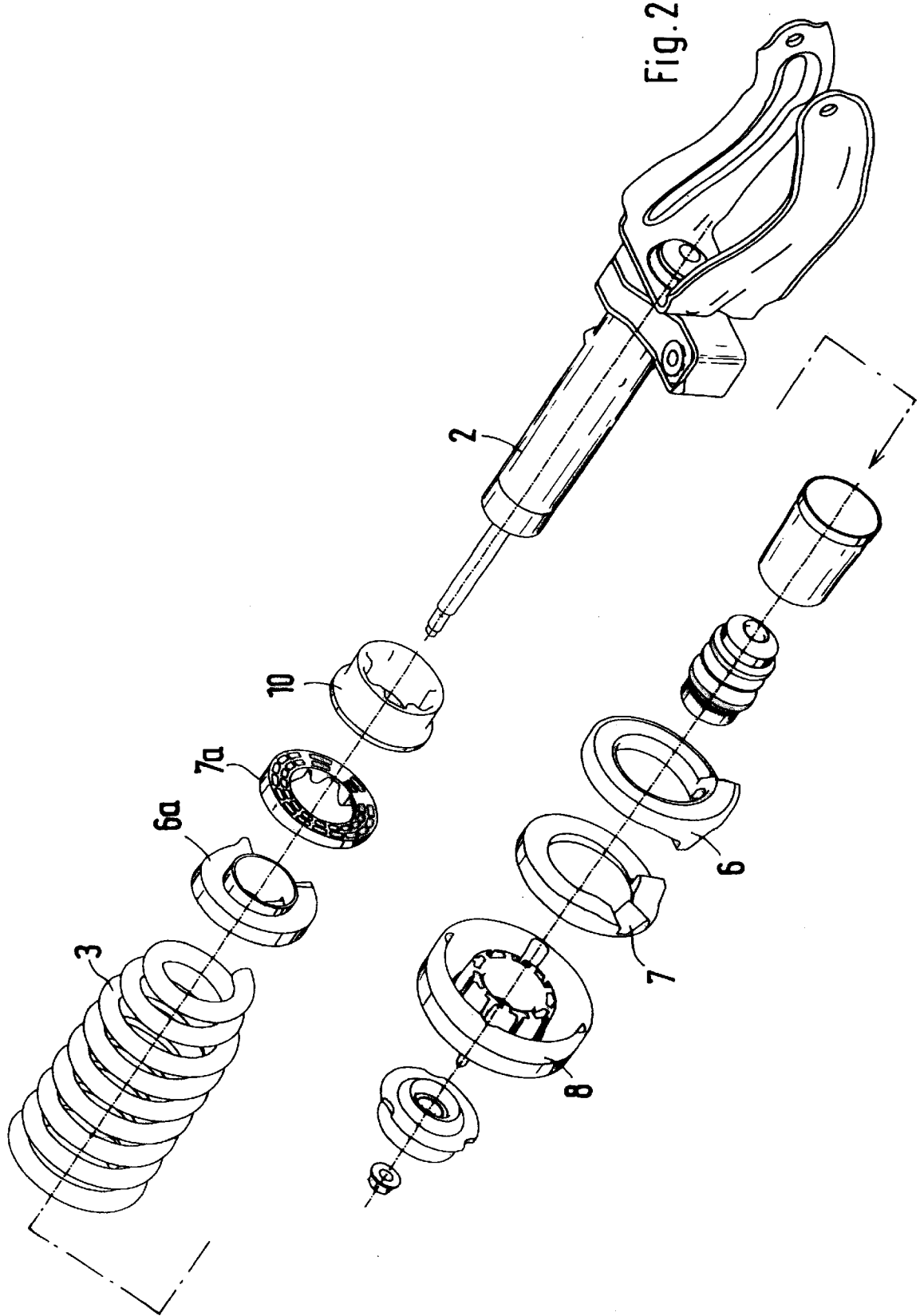
FIG. 2 is a diagrammatic representation of the upper and lower bearings.
Figure 3:
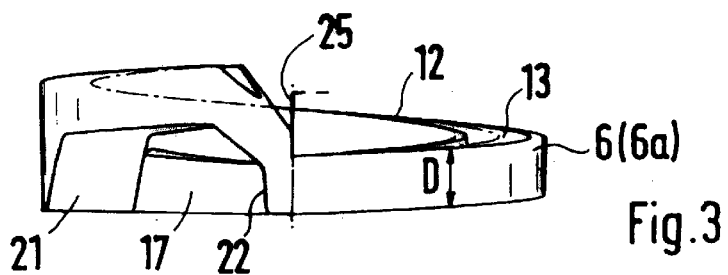
FIG. 3 is a frontal view of a spring support.
Figure 4:
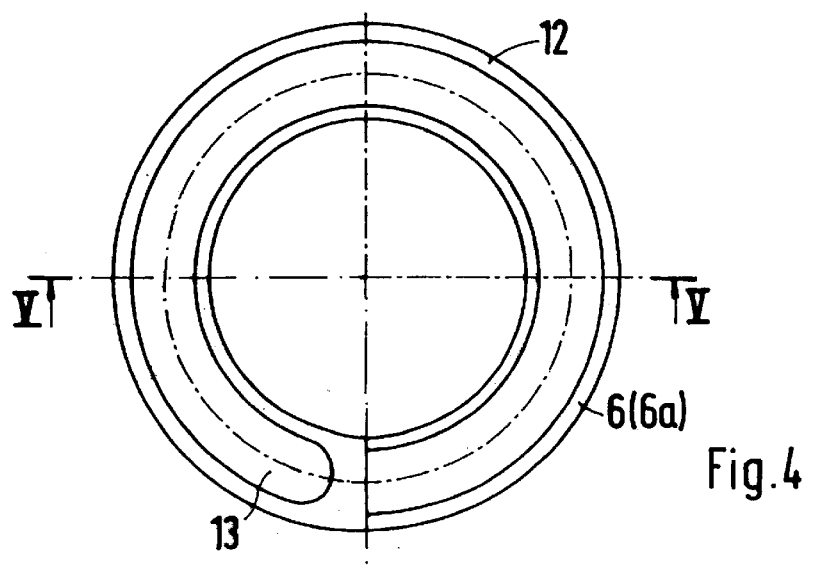
FIG. 4 is a top view of the spring support according to FIG. 3.
Figure 5:
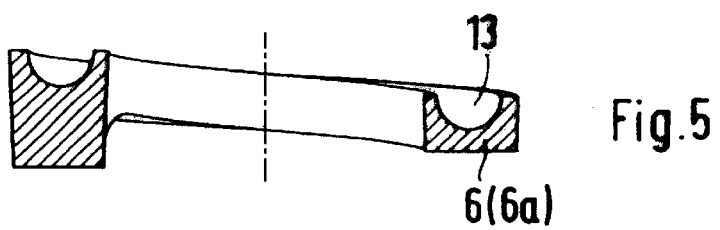
FIG. 5 is a sectional view along line V—V of FIG. 4.
Figure 6:
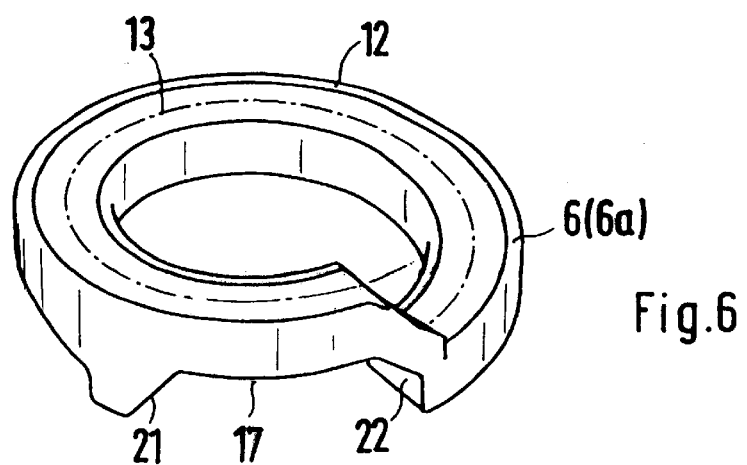
FIG. 6 is a diagrammatic representation of the spring support.
Figure 7:
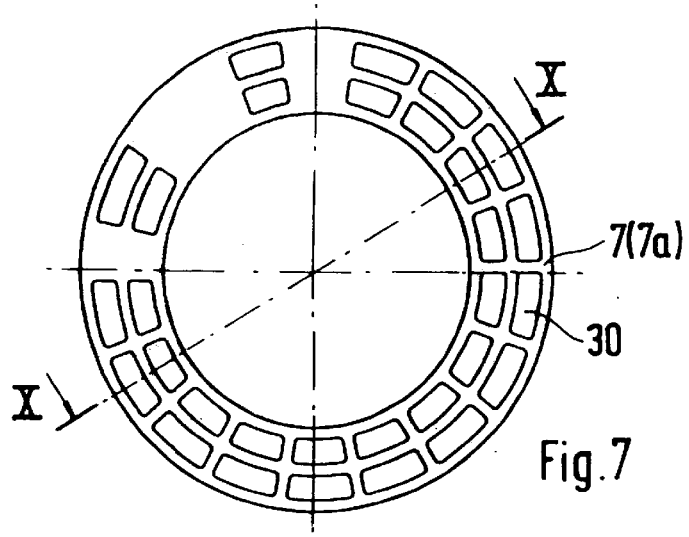
FIG. 7 is a top view of a supporting element.
Figure 8:
FIG. 8 is a frontal view of the supporting element according to FIG. 7.
Figure 9:
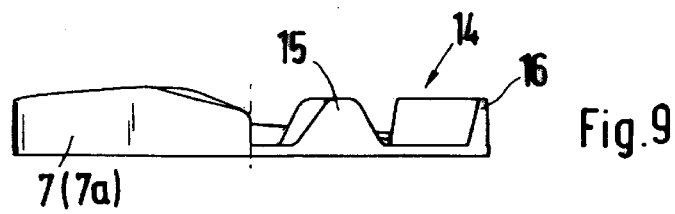
FIG. 9 is another frontal view of the supporting element.
Figure 10:
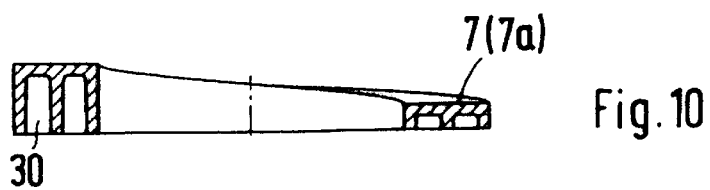
FIG. 10 is a sectional view along line X—X of FIG. 7.
Figure 11:
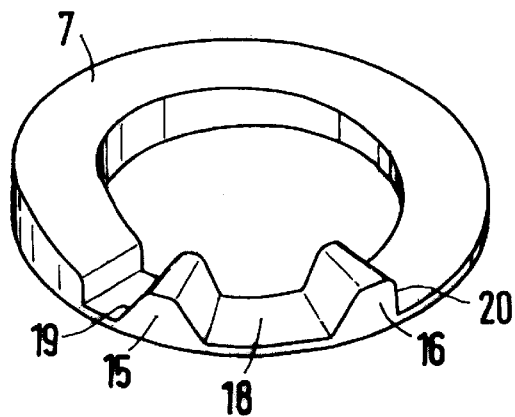
FIG. 11 is a diagrammatic representation of the supporting element.
Figure 12A:
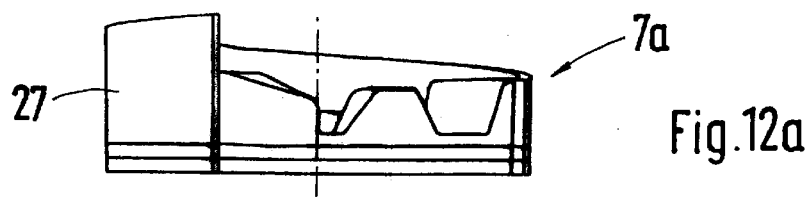
FIG. 12a is a frontal view of the supporting element according to FIG. 12.
Figure 12:
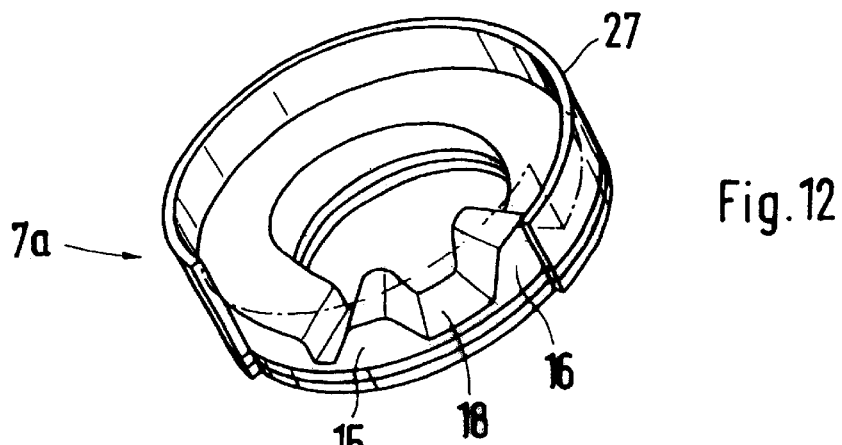
FIG. 12 is a diagrammatic representation of a supporting element of a lower bearing.

As illustrated in FIGS. 1 and 2, the spring supports 6, 6a face one another and are held in the supporting elements 7, 7a which are supported on the bearing plate 8 or on the spring plate 10, 10a.

Each of the free ends 25, 26 of the spring 3 ends close to the boundary surface 22 of the recess 17, and the spring winding is released from the spring support 6, 6a above and in the area of the recess 17. The recess 17 provides the spring element 6, 6a with approximately the same thickness D along the entire winding circumference of the spring 7 and causes a suspension effect.

The supporting element 7a of the lower bearing L1 is constructed in a pot shape with respect to the upper bearing L2. It has a bent-up edge 27 which can be provided all around or which can be interrupted in the area of the teeth 15, 16. This interruption is required for unhindered compression of the spring support 6a in this area, and also eliminates disadvantageous friction.

The supporting element 7 preferably is a rigid plastic part or an injection-molded part which has recesses 30 so that identical wall thicknesses are obtained in the entire component. The spring supports preferably are formed of rubber or similar material.

So that springs 3 of different lengths can be used and tolerances can be compensated, the supporting element 7, 7a is exchangeable and the bottom has different thicknesses, for example of 3 mm, 6 mm, 5 mm and 10 mm.

Figures 13, 15:
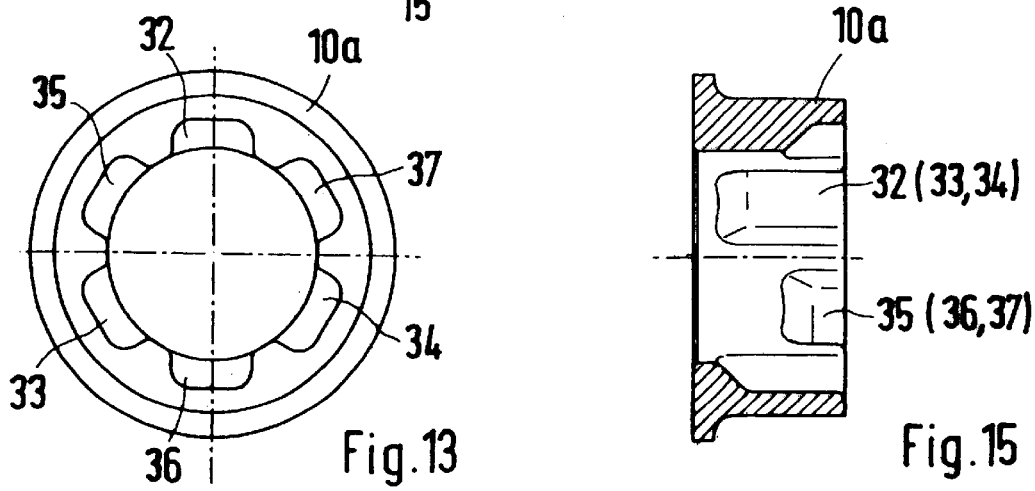
FIG. 13 is a top view of an adjustable spring plate of the lower bearing.
FIG. 15 is a sectional view of the spring plate along line XV—XV of FIG. 13.
Figure 14:
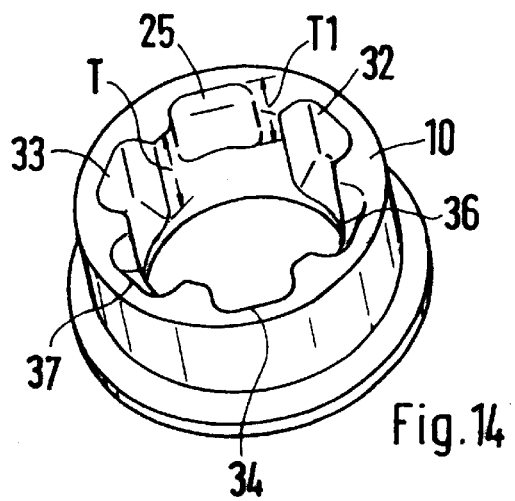
FIG. 14 is a diagrammatic representation of the spring plate.
Figure 14A:
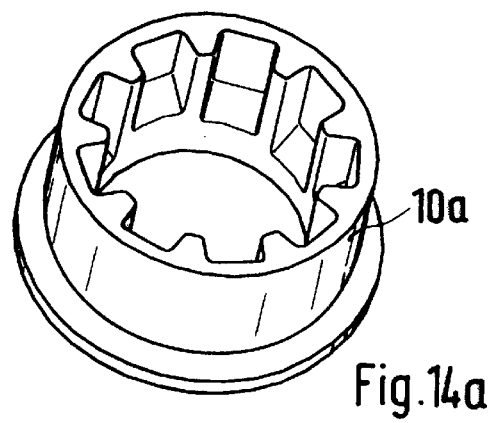
FIG. 14a is a diagrammatic representation of the spring plate with nine groove-shaped recesses.

The spring plate 10, 10a of the lower bearing L1 according to FIGS. 13, 14 and 15 can be fixedly connected with the shock absorber tube 11. According to another embodiment, the spring plate 10a can be supported on several projecting bearings 31 of the shock absorber tube 11. For achieving different height adjustments of the spring plate 10a, the spring plate has groove-shaped recesses 32, 33 and 34 on the interior side which have a greater depth T than the other recesses 35, 36, 37 with a depth T1. Instead of having six recesses, the spring plate 10a may also have nine recesses (according FIG. 14a), three recesses respectively having the same depth. The recesses of the same depth are uniformly distributed over the circumference of the spring plate.

As illustrated, the recesses are grooves provided in the interior wall surface of the spring plate 10a. According to another embodiment, they may be slot-shaped, continuous, outwardly open recesses.

Figure 16:
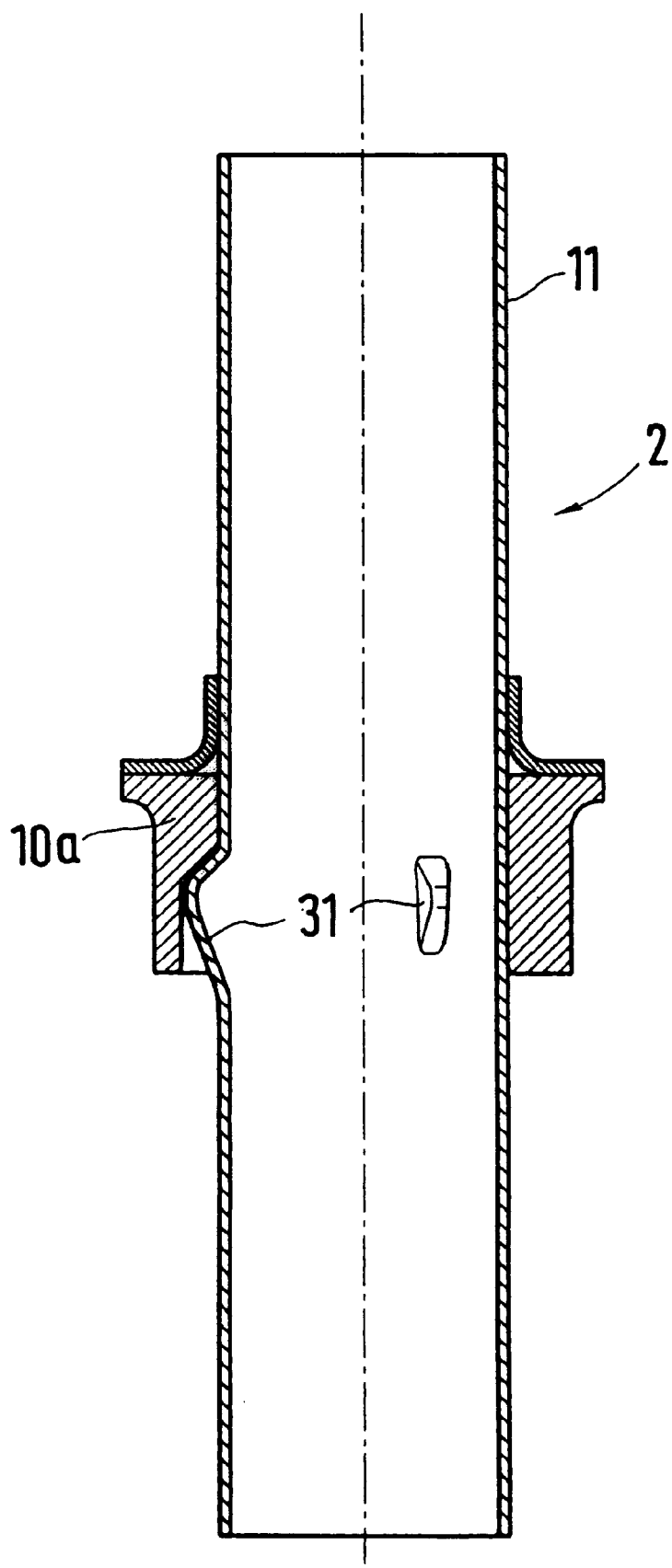

The bearings 31 on the shock absorber tube 11 may consist of welded-on projecting shoulders or pressed-out devices 31 of the shock absorber tube, as illustrated in FIG. 16.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

I claim:

1. A spring strut for a motor vehicle comprising:

bearings for a coil spring with elastic spring supports received by supporting elements, locked in the supporting elements, and on which spring supports the coil spring is supported, and a spring supporting surface on at least one of the elastic spring supports which extends in a sloped manner corresponding to a pitch of the spring and having an elasticity which is the same in a supporting area of the spring, wherein free ends of the spring are supported by way of said elastic spring supports received by the supporting elements, one of the elastic spring supports being held in one of the supporting elements on the vehicle body and the other of the elastic supports being held in the other of the supporting elements at a shock absorber tube, wherein each of the supporting elements has a closed circular construction and engages with a corresponding one of said spring supports by way of a twist fixation, wherein each twist fixation comprises mutually spaced teeth which engage in an opposing recess in a corresponding one of the spring supports, and wherein a clearance formed between the teeth and the recess has lateral boundary surfaces on which the teeth rest in a form-locking manner.

2. The spring strut according to claim 1, and further comprising a spring plate, which carries one of the supporting elements and one of the spring supports, which is detachably connected with a shock absorber tube of the spring strut and is supported, on the shock absorber tube, on bearings.

3. The spring strut according to claim 2, wherein the spring plate has at least three recesses of an identical depth which are distributed over an inner circumference thereof, and wherein additional recesses of a different depth, which are alternately distributed over the inner circumference, are provided in the spring plate.

4. The spring strut according to claim 3, wherein any of the recesses which have the same depth are arranged offset with respect to others of the recesses which have the same depth by 120°.

5. The spring strut according to claim 4, wherein the recesses are groove-shaped or are continuous slot-shaped recesses which are open toward the outside.

6. The spring strut according to claim 4, wherein the bearings are on the shock absorber tube and are formed by projecting pressed out areas or projections.

7. The spring strut according to claim 3, wherein the recesses are groove-shaped or are continuous slot-shaped recesses which are open toward the outside.

8. The spring strut according to claim 7, wherein the bearings are on the shock absorber tube and are formed by projecting pressed out areas or projections.

9. The spring strut according to claim 3, wherein the bearings are on the shock absorber tube and are formed by projecting pressed out areas or projections.

10. The spring strut according to claim 2, wherein the bearings are on the shock absorber tube and are formed by projecting pressed out areas or projections.

11. The spring strut according to claim 1, wherein the lower free end of the spring ends directly next to one of the boundary surfaces and wherein the spring winding is released above and in the area of the recess from a guide groove in one of the spring supports.

12. The spring strut according to claim 11, wherein the supporting elements are made of a rigid plastic material and the elastic spring supports are made of a rubber material.

13. The spring strut according to claim 1, wherein each of the spring supports has a supporting surface corresponding to an angle of the spring winding, which extends approximately parallel to a support surface on a corresponding one of the supporting elements to the twist fixation, and wherein the spring supports are constructed along entire circumferences thereof with approximately identical stiffnesses.

14. The spring strut according to claim 13, wherein the supporting elements are made of a rigid plastic material and the elastic spring supports are made of a rubber material.

15. The spring strut according to claim 1, wherein the supporting element of a lower bearing of the spring is a pot-shaped part with a bent-up edge which is interrupted in an area of the teeth and the corresponding recess, and wherein the edge reaches around the remaining circumferential area of a corresponding one of the spring supports.

16. The spring strut according to claim 15, wherein the supporting elements are made of a rigid plastic material and the elastic spring supports are made of a rubber material.

17. The spring strut according to claim 1, wherein the supporting elements are made of a rigid plastic material and the elastic spring supports are made of a rubber material.

* * * * *